US008166807B2

(12) United States Patent
Greeves

(10) Patent No.: US 8,166,807 B2

(45) Date of Patent: May 1, 2012

(54) APPARATUS AND METHODS FOR TESTING A FUEL INJECTOR NOZZLE

(75) Inventor: Godfrey Greeves, Hatch-End (GB)

(73) Assignee: Delphi Technologies Holding S.arl, Troy, MI (US)

( * ) Notice: Subject to any disclaimer, the term of this patent is extended or adjusted under 35 U.S.C. 154(b) by 102 days.

(21) Appl. No.: 12/663,047

(22) PCT Filed: Jun. 5, 2008

(86) PCT No.: PCT/GB2008/050412

§ 371 (c)(1),
(2), (4) Date: Dec. 4, 2009

(87) PCT Pub. No.: WO2009/010780

PCT Pub. Date: Jan. 22, 2009

(65) Prior Publication Data

US 2010/0170329 A1 Jul. 8, 2010

(30) Foreign Application Priority Data

Jul. 13, 2007 (GB) .................................. 0713678.1

(51) Int. Cl.
*G01M 15/04* (2006.01)

(52) U.S. Cl. .................................................... 73/114.45

(58) Field of Classification Search ............... 73/114.45, 73/114.46, 114.48

See application file for complete search history.

(56) References Cited

U.S. PATENT DOCUMENTS 2,436,429 A 2/1948 Hanners
2,483,637 A 10/1949 Hawthorne et al.
3,449,948 A 6/1969 Kahle et al.
5,000,043 A * 3/1991 Bunch et al. ............... 73/114.48
5,412,981 A * 5/1995 Myers et al. ............... 73/114.46
5,686,989 A 11/1997 Hoffman et al.
5,753,806 A * 5/1998 Ryan et al. ................. 73/114.46
6,053,037 A 4/2000 Kojima et al.

(Continued)

FOREIGN PATENT DOCUMENTS

DE 3316581 10/1984

(Continued)

OTHER PUBLICATIONS

UK Search Report dated Oct. 29, 2007; Claims 1 to 22.

(Continued)

*Primary Examiner* — Freddie Kirkland, III

(74) *Attorney, Agent, or Firm* — Thomas N. Twomey

(57) ABSTRACT

An apparatus and method is described for testing a multi-hole fuel injector nozzle. The apparatus comprises mounting means for the multi-hole nozzle and fuel supply means for supplying fuel to the multi-hole nozzle. The multi-hole nozzle is mounted outside a measurement chamber for capturing the fuel spray from an individual spray hole outlet of the multi-hole nozzle. In one embodiment, the apparatus includes a spray target plate, located within the measurement chamber, at which the fuel spray is directed. The spray target plate (28) is connected to a remote pressure sensor, which is used to determine the spray force of the fuel spray acting on the spray target plate. The apparatus is further arranged to determine the mass flow rate of the fuel spray. A new parameter, referred to as 'momentum efficiency' is defined, and calculated using the determined values of spray force and mass flow rate.

37 Claims, 5 Drawing Sheets

U.S. PATENT DOCUMENTS

| | | | | |
|---|---|---|---|---|
| 6,508,112 | B1 | 1/2003 | Verhoeven | |
| 6,915,683 | B2 * | 7/2005 | Schoeffel et al. | 73/114.48 |
| 6,962,070 | B1 * | 11/2005 | Tanner et al. | 73/12.07 |
| 7,171,847 | B2 * | 2/2007 | Kuhn | 73/114.48 |
| 7,197,918 | B2 * | 4/2007 | Shen | 73/114.51 |
| 7,878,050 | B2 * | 2/2011 | Cueto | 73/114.48 |
| 2005/0241367 | A1 | 11/2005 | Tanner et al. | |

FOREIGN PATENT DOCUMENTS

| | | |
|---|---|---|
| DE | 19909164 | 9/2000 |
| GB | 1072561 | 6/1967 |
| JP | 59-196969 | 11/1984 |
| JP | 61-73075 | 5/1986 |
| JP | 2-130260 | 5/1990 |
| JP | 9-49471 | 2/1997 |
| JP | 9-280137 | 10/1997 |
| JP | 10-90124 | 4/1998 |
| JP | 2001-356013 | 12/2001 |
| SU | 1305425 | 4/1987 |
| SU | 1618902 | 1/1991 |
| WO | 98/19148 | 5/1998 |
| WO | 99/28043 | 6/1999 |

OTHER PUBLICATIONS

UK Search Report dated Oct. 29, 2007; Claim 23.
UK Search Report dated Oct. 29, 2007; Claim 32.
UK Search Report dated Oct. 29, 2007; Claim 37.
International Search dated Dec. 15, 2008.
U. Schmid: "A robust flow sensor for high pressure automotive applications" Sensors and Actuators, vol. 97-98, Apr. 1, 2002, pp. 253-263, XP002506544 ISSN: 0924-4247 p. 260-261; figure 9.
Marcic M: "Sensor for injection rate measurements" Sensors ISSN 1424-8220, vol. 6, Oct. 23, 2006, pp. 1367-1382, XP002494761 MDPI the whole document.
J.J. Desantes, R. Payri, F.J. Salvador and J. Gimeno: "Measurements of Spray Momentum for the Study of Cavitation in Diesel Injection Nozzles" SAE 2003-01-0703, Mar. 3, 2003, XP002494762 Detroit, Michigan the whole document.
Marcic M: "Measuring method for diesel multipole injection nozzles" Sensors and Actuators A, Elsevier Sequoia, S.A., Lausanne, CH, vol. 107, No. 2, Oct. 15, 2003, pp. 152-158, XP004460582 ISSN: 0924-4247 the whole document.
Dennis L. Siebers: "Scaling Liquid-phase fuel penetration in diesel sprays based on mixing-limited vaporization" SAE Technical Papers Series, No. 1999-01-0528, 1999, XP002506586 ISSN: 0148-7191 p. 25-p. 26.
R. Payri, J.M. Garcia, F.J. Salvador, J. Gimeno: "Using spray momentum flux measurements to understand the influence of diesel nozzle geometry on spray characteristics" Fuel, vol. 84, Mar. 2005, pp. 551-561, XP002506552 ISSN: 0016-2361 the whole document.
Japan Office Action dated Mar. 2, 2012.

* cited by examiner

APPARATUS AND METHODS FOR TESTING A FUEL INJECTOR NOZZLE

TECHNICAL FIELD

The present invention relates to an apparatus for analysing a fuel injector nozzle of an internal combustion engine, such as a diesel engine, and to methods of testing a fuel injector nozzle using the apparatus. More specifically, the invention provides a test rig, and associated techniques, for analysing the fuel spray from the individual spray holes of a fuel injector nozzle, thereby to determine various parameters of the nozzle to a high degree of accuracy.

BACKGROUND

It is desirable to reduce harmful emissions from diesel engine exhaust, to minimise the impact on the environment, and to comply with increasingly stringent emission regulations.

Many modern diesel engines employ exhaust gas re-circulation (EGR) for reducing harmful NOx emissions. However, there is a tendency for soot emissions to increase when high levels of EGR are employed. It is known that soot emissions from diesel engine exhaust can be reduced by providing high rates of air/fuel mixing to reduce the residence time of local fuel-rich mixtures within the combustion chamber.

A significant amount of research has been conducted into diesel engine exhaust emissions (Greeves G, Tullis S and Barker B, "Advanced Two-Actuator EUI and Emissions Reduction for Heavy-Duty Diesel Engines", SAE 2003-01-0698; Tullis S and Greeves G, "HSDI Emission Reduction with Common Rail FIE", S492/S18/99). This research has included optical studies of spray/jet formation from fuel injector nozzles (Browne K R, Partridge I M and Greeves G, "Fuel property effects on air/fuel mixing in an experimental diesel engine", SAE 970185), computer models of fuel spray/jets (Partridge I M and Greeves G, "Interpreting Diesel Combustion with a Fuel Spray Computer Model", I Mech. Eng., 1998), and experiments into combustion and soot formation (Khan I M, Greeves G and Probert D M, "Prediction of Soot and Nitric Oxide Concentrations in Diesel Exhaust", I. Mech. E., 1971).

Modern diesel engines often utilise direct injection diesel combustion systems comprising multi-hole fuel injector nozzles. From the studies described above, it is concluded that the rate of air/fuel mixing, and hence reduction of soot in the engine exhaust, is significantly affected by the magnitude of the axial spray/jet momentum from the injector nozzle of each injected fuel spray/jet, rather than the fuel droplet size. The studies have also shown that, for a given fuel injection pressure and nozzle configuration (number of spray holes, spray hole effective area and direction of the fuel sprays) the axial spray/jet momentum depends on the efficiency of the injector and the nozzle in converting the upstream fuel injection pressure into axial momentum in the fuel spray/jet.

A test rig and technique for assessing the axial momentum in a fuel spray/jet is described by Desantes et al (Desantes J M, Payri R, Salvador F J and Gimeno J, "Measurements of Spray Momentum for the Study of Cavitation in Diesel Injection Nozzles", SAE 2003-01-0703). The technique involves measuring the force exerted by a fuel spray/jet on a plate positioned perpendicular to the spray axis and arranged to destroy the axial momentum of the fuel spray/jet. In this technique, the fuel spray from a spray hole of a dynamically operating diesel injector is aimed perpendicularly towards the plate with a force transducer.

The technique described by Desantes et al. utilises a dynamically varying electrical output signal from the force transducer with each injection event to give a spray force versus time diagram for the fuel spray as shown in FIG. 1. The raw spray force signal from this technique tends to vary rapidly with time, owing partly to the turbulent structure of the impacting fuel spray and the vibration forces induced in the test rig from the dynamic operation of the injector. Electronic frequency filtering can be used to give a smoother force signal, but the absolute accuracy of measuring the spray force, and hence spray momentum, does not meet the standard required of modern nozzle designs which must be measurable to an accuracy of at least one percent.

A parameter known as the nozzle discharge coefficient $C_d$ is defined in equation 1 below, and is commonly used to assess the actual (or measured) mass flow $\dot{m}$ of fuel through an injector nozzle relative to a theoretical maximum mass flow $\dot{m}_t$ value.

$$C_d = \frac{\text{measured mass flow } (\dot{m})}{\text{theoretical mass flow } (\dot{m}_t)} \tag{1}$$

The actual mass flow $\dot{m}$ can be calculated using equation 2 below, by measuring the volume V of fuel flowing through an injector nozzle during a predetermined time period T.

$$\dot{m} = \frac{V \cdot \rho_f}{T} \tag{2}$$

where $\rho_f$ is the fuel density.

The theoretical mass flow $\dot{m}_t$ is calculated according to equation 3 below, by using the theoretical Bernoulli velocity $U_t$ of fuel emerging from a nozzle spray hole of geometrical area A (based on the minimum spray hole diameter along the spray hole length).

$$\dot{m}_t = \rho_f \cdot A \cdot U_t \tag{3}$$

By combining equations 1 and 3, the nozzle discharge coefficient $C_d$ is given by equation 4 below.

$$C_d = \frac{\dot{m}}{\rho_f \cdot A \cdot U_t} \tag{4}$$

where Cd·A is the effective spray hole area relevant to the fuel mass flow.

Although the nozzle discharge coefficient $C_d$ is useful when calibrating a fuel injection system to deliver the correct quantity of injected fuel, it does not directly quantify the momentum of the fuel spray, and hence the emissions performance of the nozzle. Further, it can be difficult to measure the nozzle diameter or spray hole area A, particularly with certain shapes of spray hole nozzle such as convergent spray holes which are often used in advanced nozzle designs.

It is important to be able to measure and monitor the sample-to-sample quality of production injector nozzles, and to assess rapidly the effectiveness of new nozzle design improvements at reducing emissions. The invention aims to define a new parameter which provides an indication of the engine exhaust emissions performance of the nozzle. The invention also aims to provide a method of measuring this new parameter to a sufficiently high degree of accuracy, with a relatively simple and cost-effective rig test.

It is known that the emissions performance of an injector nozzle is also sensitive to the effective direction of fuel spray from the injector nozzle. For example, it is known that emissions performance can be affected by the exact point of impact of the fuel spray with the wall of the combustion chamber in the engine piston. The direction of the fuel spray jet might be expected to coincide with the spray hole axis which in principle should be known from the design of the nozzle. In practice the target direction of the fuel spray may deviate slightly from the spray hole axis, for example with advanced nozzle designs which may have converging spray hole shapes or spray holes with inlet rounding.

The effective direction of the fuel spray is commonly measured using optical techniques. However, optical techniques can present problems because the edges of the fuel spray/jet are often indistinct, which makes measuring the direction of the fuel spray to a sufficient degree of accuracy difficult. The invention therefore aims to provide a test rig and associated technique for measuring accurately the direction of fuel spray from an injector nozzle.

Further, it is known that the emissions performance of an injector nozzle in an engine is sensitive to the initial included angle of the fuel spray/jet emerging from the nozzle spray hole. This is because the initial included angle determines how quickly the fuel spray/jet initially entrains the surrounding air charge in the engine combustion chamber. For example, if the initial included angle is too large, the fuel spray/jet will expand and entrain the air charge in the combustion chamber too rapidly, and hence decelerate too rapidly. The result of this is that the fuel spray/jet does not penetrate far enough into the combustion chamber. This under-penetration means that the fuel spray/jet does not utilise the air available in the outer radii of the combustion chamber, thereby causing higher exhaust emissions. Conversely, if the initial included angle is too small, the fuel spray/jet will penetrate too far into the combustion chamber before it expands in width sufficiently to entrain the air charge. This over-penetration may result in liquid fuel being deposited on the walls of the combustion chamber, thereby causing unburnt hydrocarbon emissions.

In common with the effective direction of the fuel spray described above, the initial included angle is also commonly measured using optical techniques. However, optical techniques also present problems for measuring the included angle to a sufficient degree of accuracy because of the indistinct edges of the fuel spray/jet. The invention therefore further aims to provide a test rig and a suitable technique for measuring the included angle of a fuel spray/jet to a sufficiently high degree of accuracy.

SUMMARY OF THE INVENTION

In order that the invention may be understood, there now follows a description of a new parameter, referred to herein as 'momentum efficiency', which is defined herein as part of the inventive concept of the invention.

In accordance with the invention, the momentum efficiency $\eta_n$ of a fuel injector nozzle is defined as the ratio of the actual (or measured) axial momentum $\dot{M}$ in each fuel spray/jet of an injector nozzle, to a theoretical maximum axial momentum $\dot{M}_t$ in each fuel spray/jet for a measured fuel mass flow $\dot{m}$, according to equation 5 below.

$$\eta_n = \frac{\dot{M}}{\dot{M}_t} \tag{5}$$

The nozzle momentum efficiency parameter $\eta_n$ provides a quantitative indication of the efficiency of an injector nozzle in converting the upstream fuel injection pressure into axial momentum in the fuel spray/jet. In this definition of momentum efficiency, the theoretical maximum axial momentum value $\dot{M}_t$ is based on the measured fuel mass flow $\dot{m}$ and the theoretical Bernoulli velocity $U_t$, as explained in more detail below.

Equation 10 below provides an expression for the nozzle momentum efficiency $\eta_n$ in terms of parameters that are measurable using the apparatus and techniques described herein in accordance with various aspects of the invention. The nozzle momentum efficiency parameter $\eta_n$ according to equation 10 is derived below with reference to FIG. 2.

FIG. 2 shows a fuel spray/jet Sn emerging from a nozzle spray hole 27*n* in a fuel injector nozzle 1 with a steady upstream fuel pressure P1, a steady downstream ambient pressure P2 and for a fixed position of the lift of the nozzle needle 2 within the nozzle 1. In this arrangement a force measurement plate EF is arranged to be perpendicular to a designed nozzle spray hole axis and fuel jet axis x.

The theoretical velocity $U_t$ of fuel emerging from the nozzle spray hole in FIG. 2 can be defined from Bernoulli's equation as shown below by equations 6 and 7.

$$P_1 - P_2 = \frac{1}{2} \cdot \rho_f \cdot U_t^2 \tag{6}$$

$$U_t = \sqrt{\frac{2 \cdot (P_1 - P_2)}{\rho_f}} \tag{7}$$

where P1 and P2 are the upstream and downstream pressures respectively.

A momentum control box is shown by the rectangle ABCD in FIG. 2. The lines AB, BC, CD and AD define respective boundary planes which are each perpendicular to the plane of the page. The planes AD and BC are parallel and spaced apart from one another by the planes AB and CD, which are perpendicular to the planes AD and BC and parallel to one another.

The fuel spray/jet emerging from the spray hole of the injector nozzle enters the momentum control box through the plane AD in an axial direction, i.e. perpendicular to the plane AD, and exits the box in a radial direction, i.e. parallel to the plane BC and perpendicular to the planes AB and CD, as shown by the radial velocity Vex in FIG. 2.

According to the laws of momentum, the change in axial momentum flux crossing the boundary planes AB, BC, CD and AD is equal to the axial force acting on the boundaries of the control box ABCD. Since the axial momentum flux crossing BC, CD and AB are all assumed to be zero, the axial force measured across plane BC by the plate EF is equal to the axial momentum flux crossing the plane AD; the latter is the axial momentum flux input to the fuel spray by the nozzle spray hole.

The actual total momentum flux M is therefore given by equation 8 below.

$$\dot{M} = \dot{m} \cdot U = F_p \tag{8}$$

where $F_p$ is the opposing axial force required on the force measurement impact plate EF to bring the axial momentum of the fuel flowing along the fuel spray/jet path to zero, and U is an actual velocity relevant to the momentum flux $\dot{M}$.

As aforesaid, and expressed in equation 5 above, the nozzle momentum efficiency $\eta_n$ is defined as the ratio of the actual axial momentum flux M of the fuel spray to a theoretical value $\dot{M}$ based on the actual fuel mass flow $\dot{m}$ and the theoretical Bernoulli velocity $U_t$. It is also the ratio of the actual fuel velocity U emerging from the spray hole to the theoretical Bernoulli velocity $U_t$.

The simplified equations are as follows:

$$\eta_n = \frac{\dot{M}}{\dot{M}_t} = \frac{\dot{m}\cdot U}{\dot{m}\cdot U_t} = \frac{U}{U_t} \tag{9}$$

and by combining equations (7), (8) and (9), the momentum efficiency can be expressed as in equation (10) below.

$$\eta_n = \frac{\left(\frac{F_p}{\dot{m}}\right)}{U_t} = \frac{\left(\frac{F_p}{\dot{m}}\right)}{\sqrt{\frac{2\cdot(P_1 - P_2)}{\rho_f}}} \tag{10}$$

Equation 10 can be used to calculate the momentum efficiency $\eta_n$ of a nozzle spray-hole from measurements of the following:

$F_p$—force measured on a plate to destroy all of the axial spray/jet momentum;

$\dot{m}$—mass flow rate of fuel measured to emerge from a nozzle spray hole;

$P_1$—upstream fuel pressure;

$P_2$—downstream pressure for spray hole; and $\rho_f$—the fuel density at entry to the spray hole;

The definition of a nozzle momentum efficiency parameter $\eta_n$ in equation 10, is particularly advantageous because, unlike the nozzle discharge coefficient $C_d$ as defined in equation 4 above, it does not require the area A of a spray hole to be measured, and is therefore suitable for characterising the efficiency of spray holes of any shape including convergent spray holes.

Furthermore, it should be appreciated that for any given nozzle design, the definition of nozzle momentum efficiency $\eta_n$ in equation 10, is such that:

$$C_d <= \eta_n <= 1.0 \tag{11}$$

where $C_d$ and $\eta_n$ are expressed as ratios.

A nozzle design with non-tapered cylindrical spray holes with sharp spray-hole entry and exit would have a nozzle flow discharge $C_d$ value in the region of 0.7 and a nozzle spray hole momentum efficiency $\eta_n$ of about 0.82. An advanced nozzle design with convergent spray holes would have a $C_d$ value in the region of 0.82 and an $\eta_n$ value of about 0.9, giving about a 50% reduction of the engine exhaust soot emission. As aforesaid, techniques for measuring the value of $C_d$ are known, but $C_d$ is concerned with the rate of fuel mass flow and does not directly represent the efficiency of the nozzle in converting injection pressure into axial momentum in the fuel spray/jet.

Soot emission is very sensitive to the value of the nozzle momentum efficiency $\eta_n$ as shown in FIG. 3, which is a graph showing the correlation between nozzle momentum efficiency $\eta_n$ and measured levels of engine exhaust smoke. A new technique is needed to measure the various parameters expressed in equation 10, thereby enabling an absolute value of the nozzle momentum efficiency $\eta_n$ according to equation 10 to be calculated, to the required degree of accuracy of the order of 1%, so that the emissions performance of a given nozzle design or nozzle sample can be assessed.

According to a first aspect of the present invention, there is provided an apparatus for testing a multi-hole fuel injector nozzle having a nozzle needle for controlling the fuel spray from a plurality of spray hole outlets of the multi-hole nozzle, the apparatus comprising: mounting means for the multi-hole nozzle; fuel supply means for supplying fuel to the multi-hole nozzle; a measurement chamber for capturing the fuel spray from an individual spray hole outlet of the multi-hole nozzle when fuel is supplied to the multi-hole nozzle by the fuel supply means; and means for determining the spray force of the fuel spray from said individual spray hole outlet; wherein the multi-hole nozzle is mounted outside the measurement chamber and the apparatus is arranged such that the fuel spray from the individual spray hole outlet is directed into the measurement chamber.

The relative orientation of the nozzle and the measurement chamber may be adjustable to enable the fuel spray from any one of the nozzle spray hole outlets to be directed into the measurement chamber. This allows each spray hole outlet to be investigated independently. The apparatus therefore enables the nozzle mass flow, the spray force and the momentum efficiency to be measured for each spray hole, with a sufficient accuracy of 1%, and in as much detail as required, for assessment of nozzle samples. Advantageously, the present invention can provide a simultaneous measurement of spray force and fuel mass flow for each spray hole as required by equation 10 above.

The measurement chamber may include an aperture into which the fuel spray from an individual spray hole outlet of the multi-hole nozzle is directed. The aperture may be defined within a substantially conical wall or surface of the measurement chamber. The conical wall advantageously deflects the fuel spray/jets from the other spray holes of the nozzle. The aperture may be substantially circular, advantageously corresponding to the shape of the fuel jet cross-section. Alternatively the aperture may be substantially rectangular, to provide a straight edge, which can be advantageous when measuring the effective direction or initial included angle of a fuel spray/jet.

The size of the aperture in the measurement chamber is larger than the cross section of an individual spray/jet to ensure that all of the spray/jet enters the measurement chamber for the widest of the likely included jet angles. However, the size of the aperture is sufficiently small to prevent entry of the adjacent fuel spray/jets of the multi-hole nozzle. A size of aperture can be chosen which covers a typical range of nozzles with different numbers of spray holes for different engine applications.

The conical wall of the measurement chamber may be symmetrical about a measurement chamber axis which extends through the centre of the aperture and transverse to a longitudinal axis of the nozzle needle. The measurement chamber may be arranged to pivot about a pivot axis which is substantially perpendicular to both the longitudinal axis of the nozzle needle and the measurement chamber axis, and intersects the longitudinal axis of the nozzle needle close to where the respective axes of the individual spray hole outlets of the multi-hole nozzle intersect the longitudinal axis. For certain nozzle designs the spray hole axes all converge to a single point on the nozzle axis. However, for other designs of nozzle, the spray hole axes may not all converge to a single point on the longitudinal axes of the nozzle, in which case the measurement chamber may be arranged to pivot about a pivot axis extending through a mean point of intersection of the various spray hole axes with the longitudinal axis.

The measurement chamber may comprise a first outlet for fuel collected within the measurement chamber. The apparatus may further comprise measurement means in fluid communication with the first outlet of the measurement chamber. The measurement means may be arranged to quantify the mass of fuel collected within the measurement chamber.

The apparatus may include a main chamber within which the measurement chamber is located. The mounting means may be arranged such that the nozzle extends into the main chamber. The main chamber may be arranged to collect the fuel from the other spray hole outlets which is not directed into the measurement chamber. The main chamber may include an outlet for fuel. The outlet may be in fluid communication with a measurement system for quantifying the fuel collected in the main chamber. This enables the mass flow from the other spray hole outlets to be determined, thereby allowing the determination of the mass flow from an individual spray hole outlet relative to the total mass flow from the nozzle.

The apparatus may include a target mounted within the measurement chamber. The target may be connected to a sensor. The apparatus may be arranged such that the fuel spray from at least one spray hole outlet of the multi-hole nozzle is directed at the target, and the sensor may be calibrated to determine the spray force of the fuel spray impacting the target. Advantageously, the sensor may be located remotely from the target. By locating the sensor remotely from the target, the sensor is not subject to the vibrations of the apparatus and hence the sensor can output a substantially steady signal. Whereas the raw force signal from the Desantes technique described above and as shown in FIG. 1, tends to vary rapidly with time, the technique of the present invention does not suffer in this way. This allows measurements to be made to within the required degree of accuracy of 1%.

The sensor may be located outside the main chamber. In addition to reducing vibrations as described above, this arrangement provides for easy access to the sensor. The sensor may be connected to the target through a closed hydraulic circuit. The target may be mounted to a plunger which may be slidably received within a bore. The diametric clearance between the plunger and the bore is preferably within the range 0.5 to 4 microns, the bore thereby constricting the target to move in a substantially linear direction. The bore preferably extends substantially parallel to the measurement chamber axis of the measurement chamber, such that when the measurement chamber axis is aligned with the designed axis of the spray hole, only the substantially axial component of the spray force is measured. The bore may be connected to the sensor by a conduit containing hydraulic fluid. The plunger may be arranged to periodically rotate or oscillate within the bore, to minimise the static friction of the plunger within the bore.

The apparatus may provide for relative rotation between the nozzle and the measurement chamber. For example, the main chamber, including the measurement chamber, may be arranged for rotation about the vertical axis relative to the nozzle. Alternatively, the fuel injector in which the nozzle is mounted may be rotated relative to a substantially fixed main chamber. Further, the vertical position of the nozzle within the mounting may be varied. The apparatus may further comprise means for setting the needle lift of the nozzle needle, thereby enabling mass flow, spray force and momentum efficiency to be determined for each spray hole and at different needle lift settings.

It is important to allow the static ambient gas pressure in the measurement chamber to equalise with the static ambient gas pressure in the main chamber, otherwise any ambient pressure difference may affect the force sensor reading. This may be achieved by ensuring that the aperture in the measurement chamber is sized such that there is some additional clearance around the fuel spray/jet as it passes through the aperture. To further ensure that the ambient pressure is equalised between the main chamber and the measurement chamber, a vent may be placed in the main chamber. The vent may be located close to an annulus around the end of the nozzle stem such that the fuel jets draw a small flow of atmospheric air into the main chamber at low velocity, thereby preventing fuel mist escaping into the atmosphere. The measurement chamber may have a separate vent which also goes to atmosphere. This arrangement equalises the ambient pressures in the two chambers for accurate force sensor measurements with minimum escape of fuel mist to the atmosphere.

According to a second aspect of the present invention, there is provided an apparatus for testing the fuel spray from individual spray hole outlets of a multi-hole fuel injector nozzle, the apparatus comprising: mounting means for the multi-hole fuel injector nozzle; fuel supply means for supplying fuel to the multi-hole nozzle; a spray target plate at which the fuel spray from an individual spray hole outlet of the multi-hole nozzle is directed; and a sensor connected to the spray target plate and calibrated to determine the spray force of the fuel spray from the individual spray hole outlet impacting the spray target plate, wherein the sensor is located remotely from the spray target plate.

The sensor may be located outside a main chamber within which the spray target plate is located. The sensor may be connected to the spray target plate through a closed hydraulic circuit. The spray target plate may be mounted to a first plunger. The first plunger may be slidably received within a first bore. The first bore may constrict the spray target plate to move in a substantially linear direction. Preferably the diametric clearance between the first plunger and the first bore is within the range 0.5 to 4 microns. To minimise the static friction of the first plunger within the first bore, the first plunger may be arranged to periodically rotate or oscillate within the first bore. The first bore may be connected to the sensor by a conduit containing hydraulic fluid.

The closed hydraulic circuit may include calibration means comprising a substantially vertical second bore in fluid communication with the first bore and the sensor. A second plunger may be slidably received within the second bore. The second plunger may comprise means for supporting a known mass, thereby enabling the sensor to be calibrated.

According to a third aspect of the present invention, there is provided a method of testing a multi-hole fuel injector nozzle to determine the mass flow and spray force of fuel emerging from an individual spray hole outlet of the multi-hole fuel injector nozzle, the method comprising: supplying fuel to the multi-hole fuel injector nozzle for a predetermined test period (T); collecting the fuel spray emerging from an individual spray hole outlet of the multi-hole nozzle in a first chamber during the predetermined test period (T); determining the mass flow of the fuel spray from the individual spray hole outlet by measuring the quantity of fuel collected in the first chamber during the predetermined test period (T); and determining the spray force exerted by the fuel spray from the individual spray hole outlet on a target located within the first chamber during the predetermined test period (T).

The mass flow and spray force may be determined simultaneously during the test period (T). The method may include collecting the fuel spray emerging from the other spray hole outlets of the nozzle in a second chamber during the predetermined test period (T). The mass flow of fuel from the other spray hole outlets may be determined by measuring the quantity of fuel collected in the second chamber during the predetermined test period (T).

According to a fourth aspect of the present invention, there is provided a method of testing a multi-hole fuel injector nozzle comprising a plurality of spray hole outlets, thereby to calculate a momentum efficiency value $\eta_n$ of the nozzle, the method comprising determining the mass flow $\dot{m}$ and spray force $F_p$ of the individual fuel sprays emerging from the respective spray hole outlets of the multi-hole nozzle using the method described above, and calculating the momentum efficiency value $\eta_n$ using the formula:

$$\eta_n = \frac{\left(\frac{F_p}{\dot{m}}\right)}{\sqrt{\frac{2\cdot(P_1 - P_2)}{\rho_f}}} \quad (10)$$

where $\rho_f$ is the fuel density, P1 is the pressure of the fuel supplied to the multi-hole nozzle, and P2 is the ambient pressure outside the multi-hole nozzle.

According to a fifth aspect of the present invention, there is provided a method of testing a multi-hole fuel injector nozzle using a measurement chamber having an aperture defined therein, the method comprising: supplying fuel to the multi-hole nozzle; adjusting the relative orientation of the multi-hole nozzle and the measurement chamber; and monitoring the spray force of fuel entering the measurement chamber through the aperture, thereby to determine the effective direction and/or the initial included angle of the fuel spray emerging from an individual spray hole outlet of the multi-hole nozzle.

The method may include providing a continuous supply of fuel to the nozzle. The spray force may be continually monitored as the relative orientation of the nozzle and the measurement chamber is adjusted. Preferably the measurement chamber is moved relative to the nozzle. The measurement chamber may be moved in a substantially vertical plane in order to determine the effective direction and/or the initial included angle of the fuel spray emerging from the individual spray hole outlet of the nozzle in the vertical plane. Further, the measurement chamber may be moved in a substantially horizontal plane in order to determine the effective direction and/or the initial included angle of the fuel spray emerging from the individual spray hole outlet of the nozzle in the horizontal plane.

The method may include moving the measurement chamber relative to the nozzle in one direction to a first position at which a decrease in spray force is monitored. The method may also include moving the measurement chamber further in the same direction to a second position at which the monitored spray force decreases substantially to zero. The initial included angle of fuel emerging from the individual spray hole outlet may be determined from the difference between the first and second positions of the measurement chamber.

Advantageously, any of the methods described above may be performed for a fixed needle lift of the nozzle. These methods may be repeated for a range of values of needle lift, and for each spray hole of the multi-hole nozzle.

BRIEF DESCRIPTION OF THE DRAWINGS

Reference has already been made to FIGS. 1 to 3 of the accompanying drawings in which.

Figure 4:
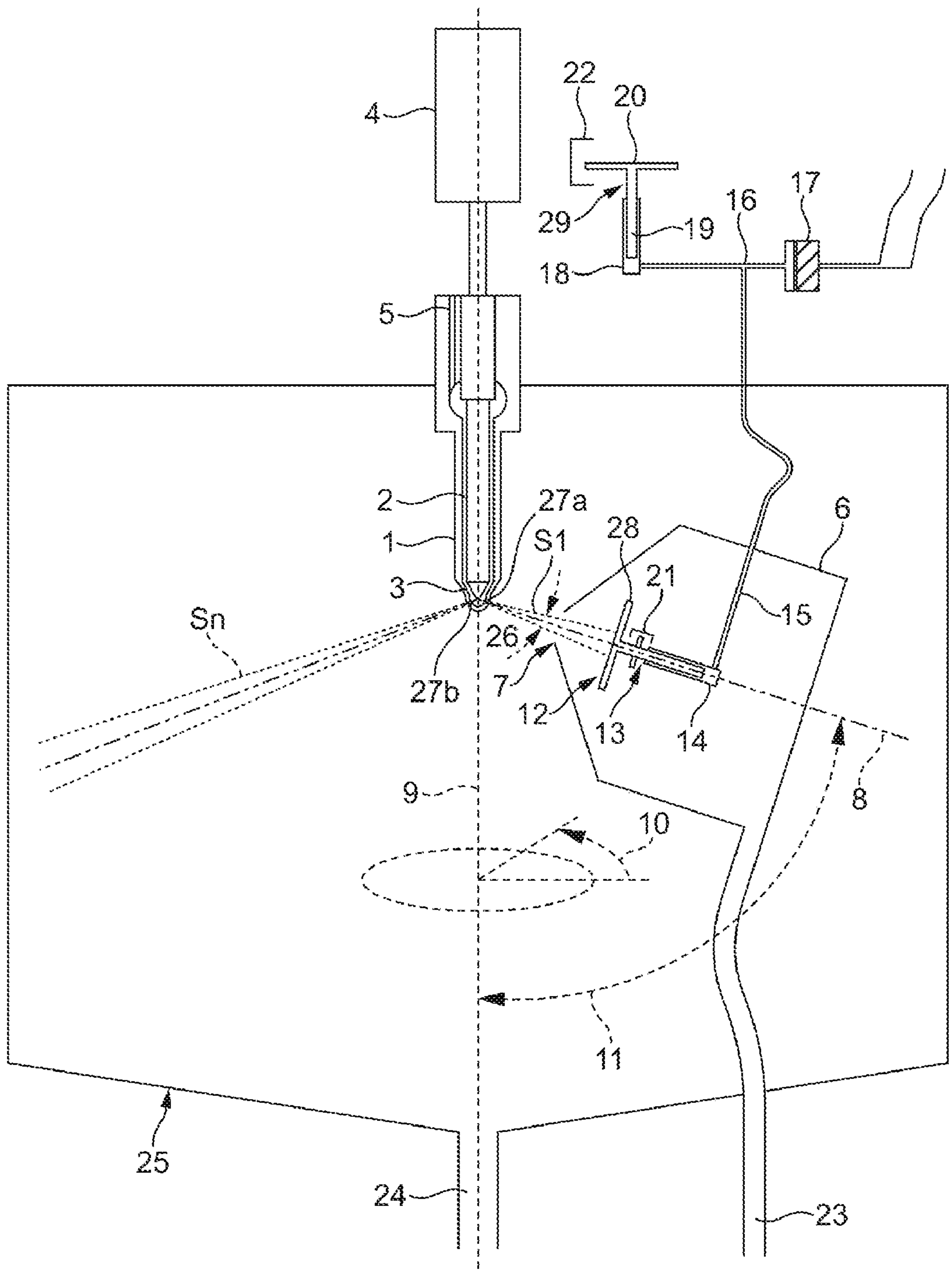
Figure 5:
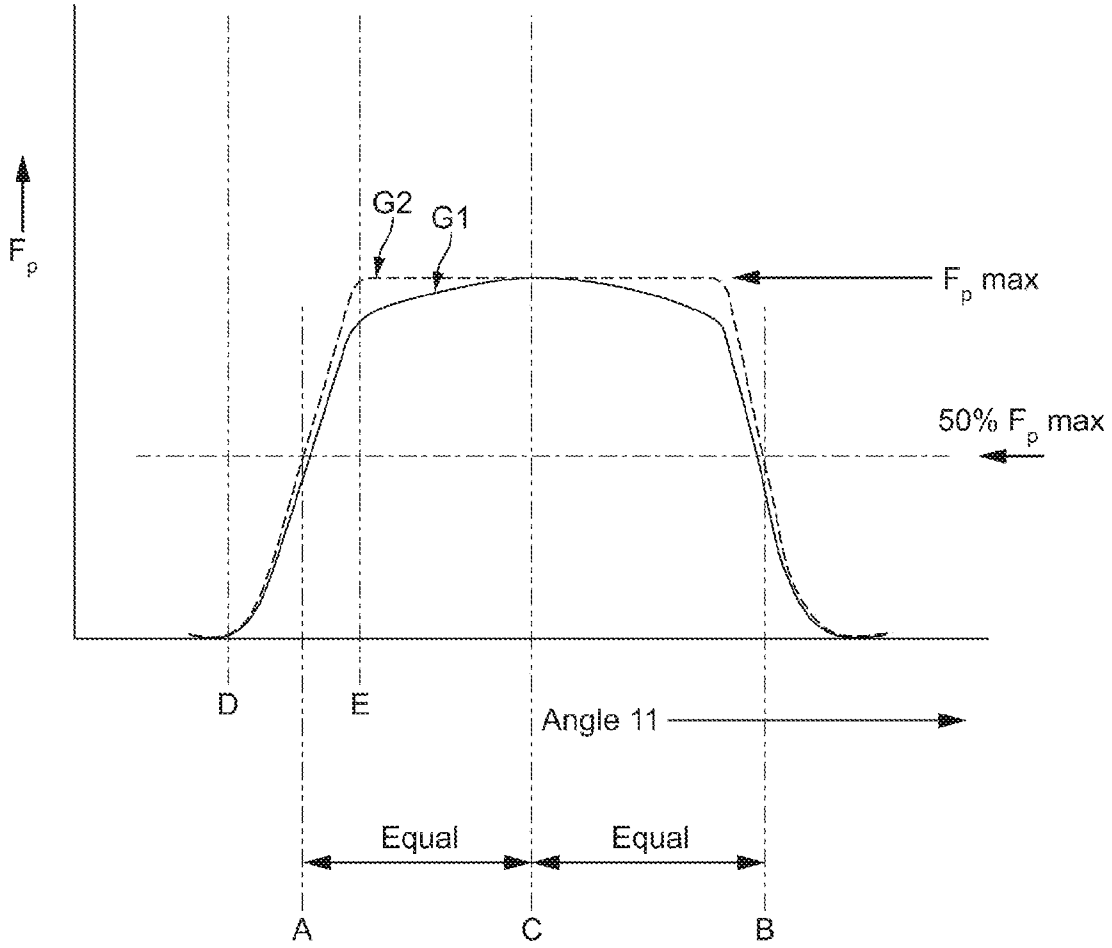

In order that the invention may be more readily understood, reference will now be made, by way of example, to FIG. 4 and FIG. 5, in which:

FIG. 4 is a schematic showing a test rig for a fuel injector nozzle in accordance with the present invention; and FIG. 5 is a plot of spray force versus angle for a fuel spray jet, which is used to determine the effective direction and initial included angle of the fuel spray jet.

DETAILED DESCRIPTION OF THE PREFERRED EMBODIMENTS

Referring to FIG. 4, a section through a test rig of an embodiment of the invention is shown schematically. A sample multi-hole fuel injector nozzle 1 is shown mounted on the test rig. The fuel injector nozzle 1 is mounted within a fuel injector body (not shown in FIG. 4), and extends into a main chamber 25. Fuel is supplied to the nozzle 1 via an inlet drilling 5 in the nozzle 1. An electronic control valve (not shown in FIG. 4) is provided for controlling fuel flow to the nozzle 1.

A plurality of spray hole outlets are defined in the nozzle 1, of which a first spray hole outlet 27*a* and a second spray hole outlet 27*b* are indicated in FIG. 4. The nozzle 1 comprises a nozzle needle 2, which is moveable relative to a needle seat 3 for controlling fuel flow through the spray hole outlets 27*a*, 27*b*. The spray hole outlets 27*a*, 27*b* are closed by the nozzle needle 2 when the nozzle needle 2 is seated, such that fuel flow through the spray hole outlets 27*a*, 27*b* is prevented. An injection event is commenced when the nozzle needle 2 is lifted away from the seat 3, to open the spray hole outlets 27*a*, 27*b* and thereby enable fuel to flow out of the spray hole outlets 27*a*, 27*b* as shown in FIG. 4. A micrometer 4 for precisely controlling the lift of the nozzle needle 2 relative to the seat 3 is positioned above the nozzle 1.

A measurement chamber 6 is located within, and mounted to the main chamber 25. In this example, the measurement chamber 6 is arranged to collect the fuel spray S1 emerging from the first spray hole 27*a* of the nozzle 1. The measurement chamber 6 comprises a conical surface arranged to face the nozzle 1. A substantially circular opening/aperture 7 is defined substantially centrally in the conical surface. The conical surface is substantially symmetrical about a measurement chamber axis 8 which extends through the circular opening 7, as shown in FIG. 4. The measurement chamber 6 comprises an outlet pipe 23 through which the fuel collected in the measurement chamber 6 is channelled away under gravity to a first measurement system (not shown in FIG. 4). Likewise, the main chamber 25 comprises an outlet 24 through which fuel from the other spray jets Sn, which does not enter the measurement chamber 6, is channelled away towards a second measurement system (not shown).

A vertical axis 9 of the test rig is shown in FIG. 4. The vertical axis 9 extends substantially centrally through the nozzle 1, and is coincident with the longitudinal axis of the nozzle 1. The measurement chamber 6 is arranged such that the measurement chamber axis 8 is transverse to the vertical axis 9, and intersects the vertical axis 9 close to where the respective axes of the spray hole outlets 27*a*, 27*b* of the nozzle 1 intersect the vertical axis 9.

The nozzle 1 is rotatably mounted in the test rig so that the nozzle 1 can be rotated about the vertical axis 9, in order to adjust the orientation of the nozzle spray holes 27*a*, 27*b* relative to the measurement chamber 6. The measurement chamber 6 is arranged to pivot in a vertical plane, about a horizontal axis that is orthogonal to both the vertical axis 9, and the measurement chamber axis 8, and which extends through the point of intersection between the measurement chamber axis 8 and the vertical axis 9. The angle of inclination 11 of the measurement chamber 6 with respect to the nozzle 1, that is the angle between the vertical axis 9 and the measurement chamber axis 8, is adjusted by a mechanism (not shown).

A spacing washer (not shown) is provided under the injector body (not shown) on the main chamber 25. The spacing washer may be adjusted to alter the vertical position of the sample nozzle 1 relative to the main chamber 25 and the measurement chamber 6. This adjustment is used to ensure that the respective axes of the spray hole outlets 27*a*, 27*b* intersect the vertical axis 9 at a similar vertical position to the intersection of the measurement chamber axis 8 with the vertical axis 9.

A spray target plate 12 is mounted substantially centrally within the measurement chamber 6. The spray target plate 12 comprises a spray impact surface 28, which is substantially perpendicular to the measurement chamber axis 8. The spray impact surface 28 of the spray target plate 12 faces the aperture 7 in the measurement chamber 6, such that the fuel spray/jet S1 entering the measurement chamber 6 through the aperture 7 impacts the spray impact surface 28. A pressure sensor 17 is located remotely from the spray target plate 12. The pressure sensor 17 is connected to the spray target plate 12 by an hydraulic system, as described in further detail below. The pressure sensor 17 outputs an electrical signal that corresponds to the pressure of the fuel spray S1 impacting the spray impact surface 28 of the spray target plate 12.

The hydraulic system connecting the spray target plate 12 and the pressure sensor 17 comprises a first plunger 13 extending from a rear surface of the spray target plate 12, and along the measurement chamber axis 8. The first plunger 13 is received within a first blind bore 14 of a housing (not shown). There is a close sliding fit between the first plunger 13 and the first bore 14, the diametric clearance between the first plunger 13 and the first bore 14 being within the range 0.5 to 4 microns, the first bore 14 thereby constraining the first plunger 13 to move in a substantially linear direction. A means (not shown) is used to provide a rotating motion of the first plunger 13 in the first bore 14 to substantially eliminate static friction.

The hydraulic system further comprises a tee-piece 16 located outside the main chamber 25, and connected to the first blind bore 14 by a pipe 15. One branch of the tee-piece 16 is connected to the pressure sensor 17. The other branch of the tee-piece 16 is connected to a substantially vertical second blind bore 18 provided in a further housing (not shown). A second plunger 19 is slidably received within the second blind bore 18. The second plunger 19 forms a close sliding fit within the second bore 18, the diametric clearance between the second plunger 19 and the second bore 18 being within the range 0.5 to 4 microns, the second bore 18 thereby constraining the second plunger 19 to move in a substantially linear direction. A means (not shown) is used to provide a rotating motion of the second plunger 19 in the second bore 18 to substantially eliminate static friction.

An upper end 29 of the second plunger 19 is provided with a platform 20. Travel stops 21 and 22 are used to limit the maximum axial movement of the first and second plungers 13 and 19 respectively. The closed hydraulic circuit formed between the first bore 14, the pipe 15, the tee-piece 16, the pressure sensor 17 and the second bore 18, is filled with a hydraulic fluid by means of a priming system (not shown). The priming system is linked to the hydraulic circuit so that a quantity of hydraulic fluid is substantially trapped in the hydraulic circuit and such that the first and second plungers 13, 19 are both clear of the respective travel stops 21 and 22. Additional pipe-work (not shown) is linked to the hydraulic circuit to allow bleeding of the hydraulic circuit to remove any trapped air.

A number of techniques for testing a sample nozzle 1 using the test rig of FIG. 4 are described below. Described first is a technique for simultaneous measurement of mass flow $\dot{m}$ and spray force $F_p$ from the individual spray hole outlets 27(*a*-*n*) of the nozzle 1, thereby enabling the momentum efficiency $T_n$ of the spray holes 27(*a*-*n*) and of the nozzle 1 to be calculated according to equation 10 above. Also described are techniques for measuring the effective directions and included angles of the individual sprays/jets Sn emerging from respective ones of the spray holes 27(*a*-*n*).

To test a sample nozzle 1 using the test rig, the sample nozzle 1 is mounted to the injector body (not shown) on the test rig. The relative orientation of the nozzle 1 and measurement chamber 6 are adjusted to allow any one of the fuel sprays Sn (S1 in this example) from the sample nozzle 1 to enter the circular aperture 7 in the measurement chamber 6. Specifically, the spacing washer (not shown) is adjusted to set the vertical position of the nozzle 1 relative to the main chamber 25 and the measurement chamber 6. The nozzle 1 is rotated about the nozzle axis 9 by an angle 10, up to 360 degrees, and the angle of inclination 11 of the measurement chamber 6 relative to the nozzle 1 is adjusted so that the measurement chamber axis 8 is substantially coincident with the designed spray hole axis x (see FIG. 2) of the spray hole 27*a* under investigation.

Before the sample nozzle 1 is tested, the test rig is calibrated with no fuel supplied to the nozzle 1 so that there is no fuel spray impacting the spray target plate 12. To calibrate the test rig, a calibration weight of known mass is placed on the platform 20 at the upper end 29 of the second plunger 19. The calibration weight provides a known pressure in the closed hydraulic circuit connected to the pressure sensor 17, thereby allowing in-situ calibration of the pressure sensor 17 to measure spray force $F_p$. Before calibration, the second plunger 19 is rotated within the second bore 18 to substantially eliminate static friction between the second plunger 19 and the second bore 18. Once the test rig has been calibrated, the calibration weight is removed, and the sample nozzle 1 is tested as described in further detail below.

To test the sample nozzle 1, the lift of the nozzle needle 2 relative to the needle seat 3 is set using the micrometer 4. Fuel is then supplied to the nozzle 1 through the nozzle inlet 5. The fuel is supplied at a predetermined pressure, and for a predetermined time period T, under the control of the electronic control valve (not shown). A plurality of continuously flowing fuel spray jets Sn emerge from the respective spray holes 27(*a*-*n*) of the sample nozzle 1. In this example, the relative orientation of the sample nozzle 1 and the measurement chamber 6 are set so that the first spray/jet S1 emerging from the first spray hole 27*a* of the sample nozzle 1 is investigated, thereby to characterise the first spray hole 27*a*.

The spray S1, emerging from the first spray hole 27*a* in the sample nozzle 1, passes through the circular aperture 7 in the measurement chamber 6 and impacts the spray impact surface 28 of the spray target plate 12. The sprays S2 to Sn from the other spray holes 27*b* to 27*n* of the sample nozzle 1 are either directed away from the measurement chamber 6, or deflected by the conical surface of the measurement chamber 6. Either way, these sprays S2 to Sn do not enter the measurement chamber 6.

In addition to measuring the electrical signal output by the pressure sensor 17 when the fuel impacts the spray target plate 12, a measurement of the electrical signal is also made with no fuel impacting the target plate 12. The axial spray force $F_p$ of the first spray S1 is calculated from the difference between the measured electrical signal output by the pressure sensor 17 with and without the fuel spray S1 impacting the spray target plate 12. Since the spray target plate 12 is constrained to move along the axis of the plunger 13, only the axial spray force along the plunger 13 axis is recorded by the pressure sensor 17.

The fuel from the spray/jet S1, which is collected in the measurement chamber 6 during the test period T, flows from the measurement chamber 6, through the outlet pipe 23, and into the first fuel flow measurement system (not shown) where it is quantified, by measuring its mass or volume. The measured mass flow ṁ is then calculated using equation 2 above if volume is measured, or by dividing the measured mass of fuel by the test period T. An accurate value for the momentum efficiency $\eta_1$ of the first spray hole 27*a* is then calculated from the measured axial spray force $F_p$ and mass flow ṁ using equation 10, in which P1 is the pressure of the fuel supplied to the injector nozzle 1 and P2 is the pressure within the main chamber 25.

$$\eta_n = \frac{\left(\frac{F_p}{\dot{m}}\right)}{\sqrt{\frac{2\cdot(P_1 - P_2)}{\rho_f}}} \tag{10}$$

The combined fuel flow, corresponding to the fuel sprays S2-Sn emerging from the other spray hole outlets 27*b*-27*n* which does not enter the measurement chamber 6, is collected in the main chamber 25 and flows from the outlet 24 into the second fuel flow measurement system (not shown) where it is quantified for the test period T, as described above in relation to the first fuel flow measurement system. The total mass flow from the nozzle 1 is quantified by combining the measurements from the first and second fuel flow measurement systems. Further, the mass flow of a particular spray hole relative to the total mass flow can be calculated from the ratio of the two measurements.

The momentum efficiency 77 of the other spray holes 27(*b*-*n*) is measured in a similar manner to the method described above by suitable setting of the angles 10 and 11. This can be done without disturbance of the needle 2 in the sample nozzle 1 which means that any eccentricity of the needle 2 in the nozzle 1 is the same whilst all the spray forces $F_p$ and mass flows ṁ are being measured for each of the nozzle sprays Sn. This allows the spray-to-spray uniformity, in terms of both mass flow ṁ and momentum efficiency $\eta_n$, of a given sample nozzle 1 to be calculated with a given position of the needle 2 in the nozzle 1.

The needle lift is adjusted using the micrometer 4, and the measurements described above are repeated for different values of needle lift. The arrangement shown in FIG. 4, and the method described above, provides an accurate and comprehensive characterization of the momentum efficiency $\eta_n$ of the sample nozzle 1 as well as mass flow ṁ.

Figure 3:
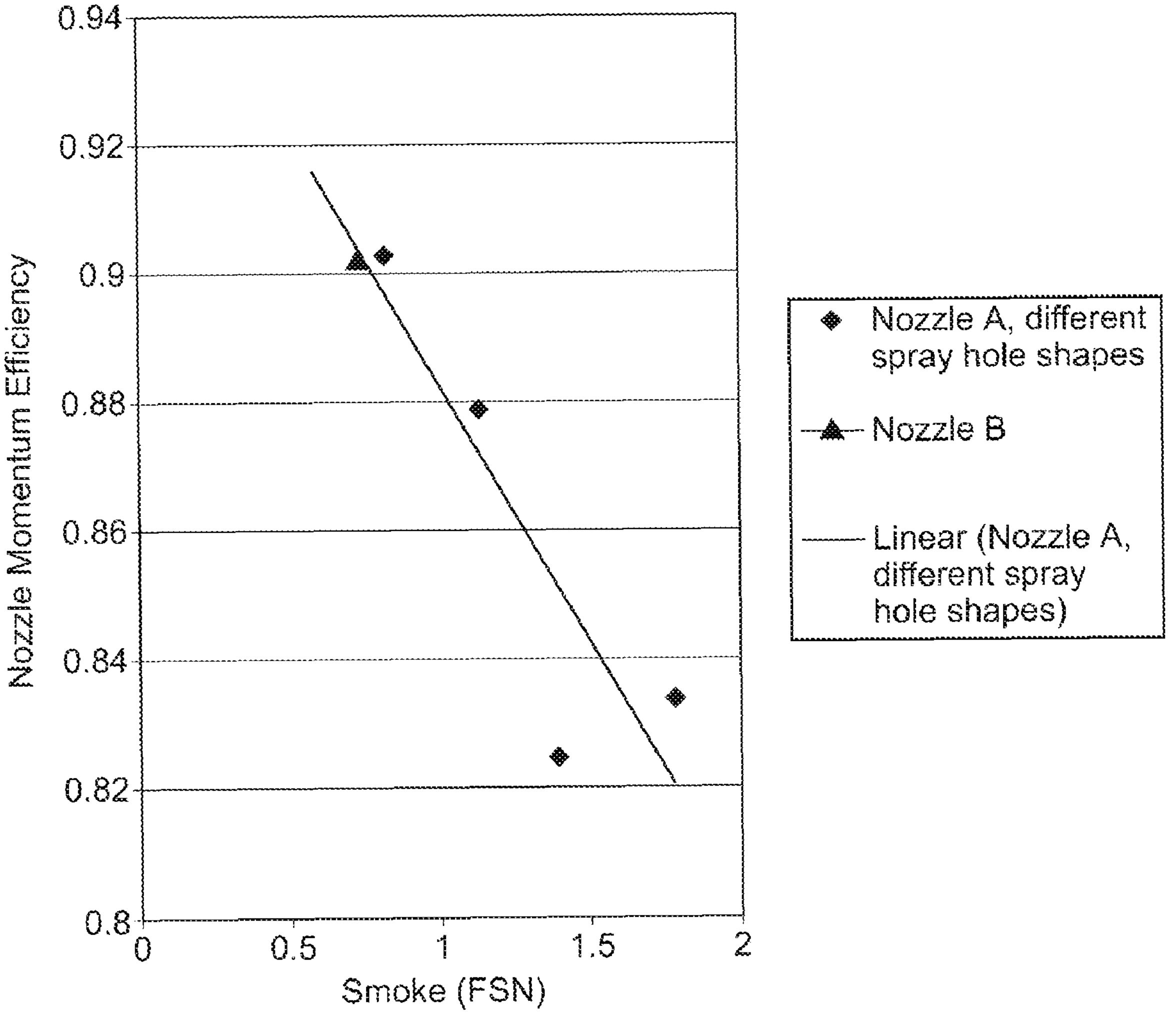
FIG. 3 is a graph showing the correlation between nozzle momentum efficiency and the measured engine exhaust smoke.

FIG. 3 shows sample momentum efficiency values $\eta_n$ measured with the test rig of FIG. 4 for various different nozzle and spray-hole-shape designs. These results show the correlation of the nozzle momentum efficiency values $\eta_n$ measured with the test rig of FIG. 4 with the measured exhaust smoke values measured on a single-cylinder engine for the same nozzle samples as measured on the test rig. The results show a reduction of the engine exhaust smoke for nozzle designs with higher momentum efficiency $\eta_n$.

The test rig of the invention enables the nozzle mass flow ṁ, the spray force $F_p$ and the momentum efficiency $\eta_n$ to be measured for each spray hole 27*n*, at different needle lift settings, with a sufficient accuracy of 1%, and in as much detail as required, for assessment of nozzle samples. An accurate measurement is ensured by constraining the spray target plate 12 to move along the axis of the plunger 13, such that only the axial spray force along the plunger 13 axis appears at the sensor 17. Also the pressure sensor 17 is located remotely from the target plate 12 so does not get the vibration inherent in prior art systems.

A technique for measuring the effective spray direction and initial included angle of individual fuel sprays/jets Sn of a multi-hole nozzle 1 is described below with reference to FIGS. 4 and 5.

The relative orientations of the sample nozzle 1 and measurement chamber 6 are set as described above in order to investigate the spray S1 from the first nozzle spray hole 27*a*, thereby to determine the effective direction of the fuel spray/jet from that spray hole.

The electronic valve in the nozzle inlet 5 is opened to allow a continuous flow of fuel to the sample nozzle 1. The axial spray force $F_p$ of the spray jet S1 is monitored using the pressure sensor 17, in the same way as described in the method above, as the spray/jet S1 impacts the spray impact surface 28 of the spray target plate 12 within the measurement chamber 6. At the same time as monitoring the spray force $F_p$, the measurement chamber 6 is pivoted about the horizontal axis to vary the vertical angle 11 between the vertical axis 9 of the test rig and the measurement chamber axis 8, as shown in FIG. 4.

Figure 1:
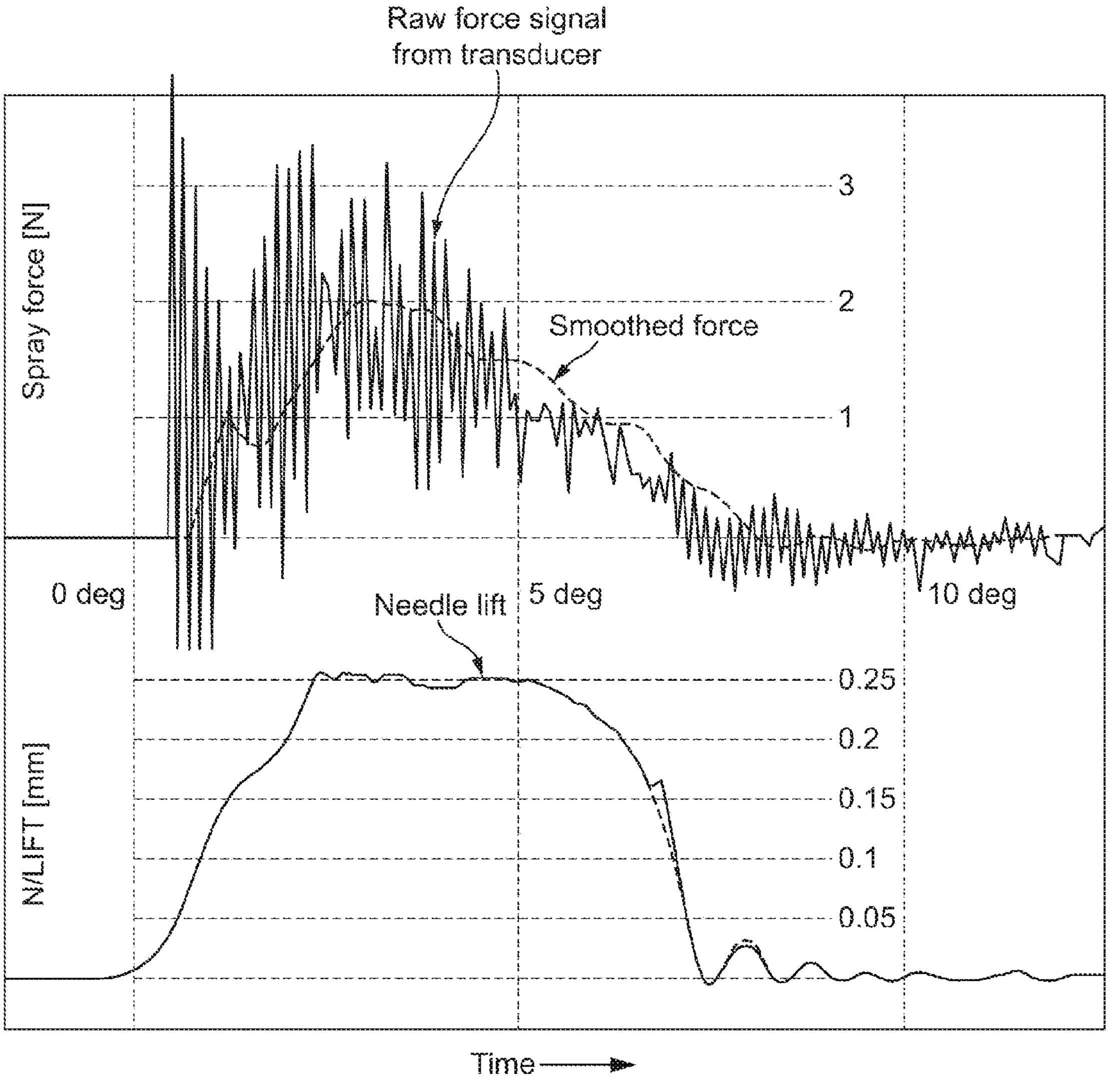
FIG. 1 is a graph showing a spray force signal recorded for dynamic operation of a fuel injector in accordance with a prior art method.
Figure 2:
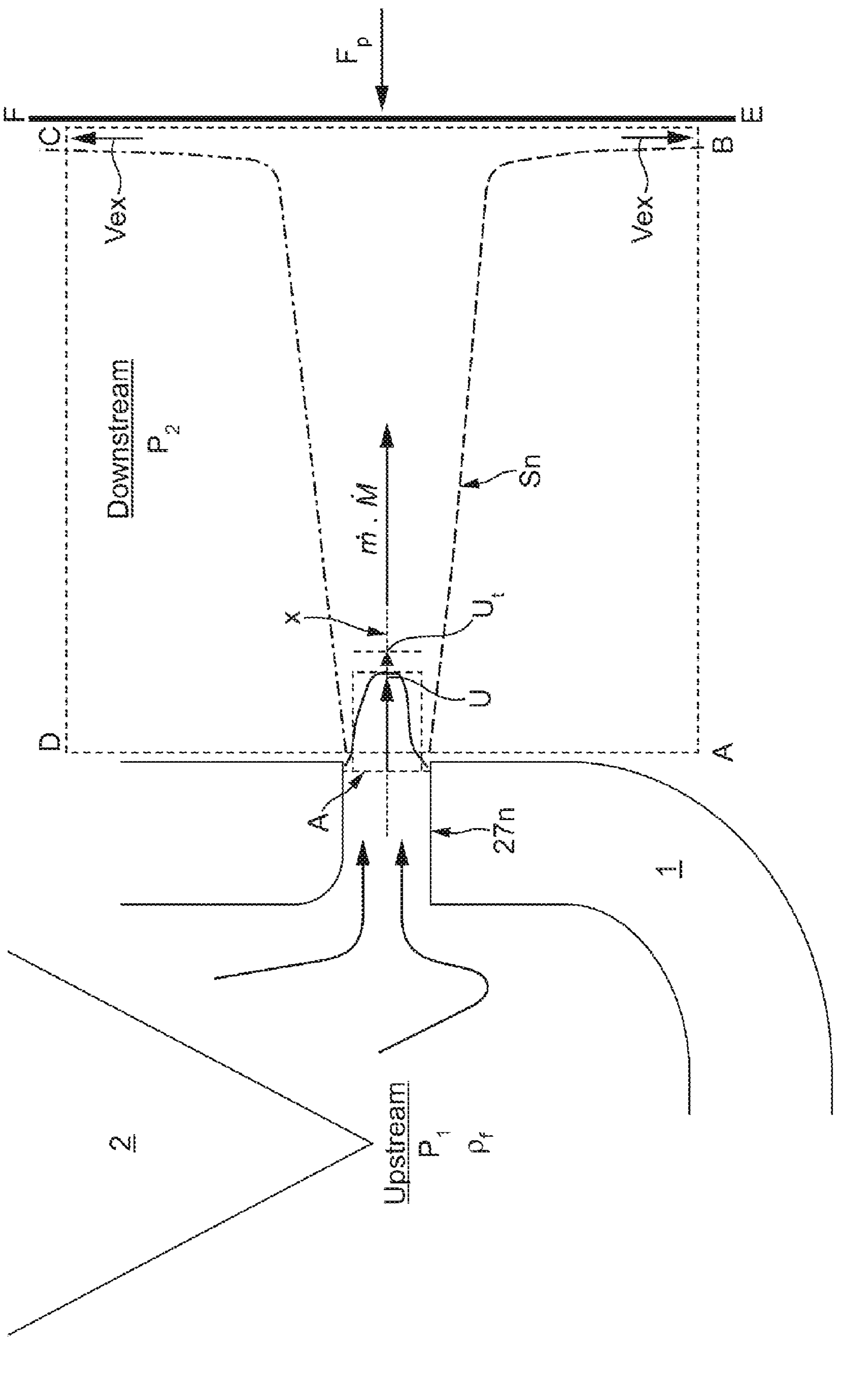
FIG. 2 is a schematic showing a fuel spray jet emerging from a nozzle spray hole outlet towards a force measurement plate.

The spray force values $F_p$ are recorded as the vertical angle 11 of the measurement chamber axis 8 is varied slowly or in small steps on either side of the designed spray-hole axis x (FIG. 2). This gives a graph of $F_p$ versus the absolute value of the vertical angle 11 relative to the vertical axis 9 as shown in FIG. 5. As indicated in FIG. 5, a vertical angle C corresponds to the measurement chamber axis 8 being in line with the true axis of the fuel spray/jet S1, i.e. the effective direction of the fuel spray/jet S1. The method of determining the angle C from the force versus angle 11 plot in FIG. 5 is described below with reference to FIGS. 4 and 5.

As the vertical angle 11 of the measurement chamber axis 8 deviates on either side of the true axis of the fuel spray/jet S1, the measured force $F_p$, indicated by the curve G1 in FIG. 5, at first reduces gradually according to a known relationship. This relationship involves resolving a component of the spray force $F_p$ into a component along the vertical angle 11 of the measurement chamber axis 8 using an initial assumption for the angle C. This gives a first estimate of a corrected force graph, which is indicated by the dashed curve G2 on FIG. 5.

At a particular deviation of the vertical angle 11 from the angle C, as indicated by the angle E in FIG. 5, the upper or lower edge of the aperture 7 in the measurement chamber 6 begins to cut off part of the fuel spray/jet S1 entering the measurement chamber 6. Beyond this angle E, as the measurement chamber axis 8 deviates further from the angle C, the spray force $F_p$ drops rapidly until the spray/jet S1 is completely cut off at an angle D in FIG. 5.

An angle A, at which the corrected spray/jet force G2 falls to 50% of the maximum value ($F_p$ max), can be deduced from the plot of spray force $F_p$ versus angle in FIG. 5. The true value of the vertical angle 11, corresponding to the effective direction of the fuel spray/jet S1 in the vertical plane, can be deduced from the angle A by adding or subtracting the difference in the angle A-C. This difference angle A-C is a known angle which the lower or upper edge of the aperture 7 subtends relative to the measurement chamber axis 8 at the point where the measurement chamber axis 8 intersects the vertical axis 9.

The analysis steps described above provide a new estimate for the value of the angle C. Successive iterations of the steps described above are then performed until the value of C converges to give the corrected curve G2. The calculation may be done in the same way for the other side of the curve to check the value of C. Alternatively, if both sides of the curve are measured, then the angle C can be deduced from the bisector of the angles A and B, where A and B are the 50% $F_p$-max values for spray/jet cut off on the lower or upper edges of the aperture 7 respectively.

The measured value for the effective direction of the fuel spray/jet is used to ensure that nozzle designs with different spray-hole shapes and other internal design features provide the correct spray/jet target direction to best optimize the engine emissions performance.

The initial vertical included jet angle 26 can also be deduced from the recorded spray force $F_p$ versus angle 11 plot in FIG. 5 by calculating the difference between the angle E, which corresponds to the aperture 7 in the measurement chamber 6 starting to cut off the spray/jet S1, and the angle D, which corresponds to the aperture cutting off the entire spray/jet S1.

The effective spray/jet target direction and initial included angle are measured in the horizontal plane in a similar manner to that described above, except that the fuel injector in which the nozzle 1 is mounted, is rotated about the vertical axis 9, relative to the main chamber 25 in which the measurement chamber 6 is mounted, to vary the horizontal angle 10 in FIG. 4.

The initial included jet angle values measured in both vertical and horizontal planes are used to check the symmetry of the spray/jet. These values are also used to check that nozzle designs with different spray hole shapes and other internal design features provide an appropriate initial jet angle for best spray penetration and lowest emissions in a given design of engine.

The above measurements are repeated for each of the individual spray holes $S_n$, and for each hole the measurements are repeated for a range of needle lift values by adjusting the micrometer 4. It will be appreciated that the plot shown in FIG. 5 could equally be obtained by conducting the process in reverse, i.e. with the measurement chamber axis 8 initially at a significant deviance from the angle C in FIG. 5, such that substantially no fuel enters the measurement chamber 6 through the aperture 7. The angle of the measurement chamber axis 8 could then be reduced slowly or in small steps towards the angle C in FIG. 5 whilst monitoring the spray force $F_p$. The spray force $F_p$ will increase as the angle approaches the angle C, as shown in FIG. 5.

The operation of the test rig of FIG. 4 is automated under the control of a computer. Stepper motors (not shown) operate gear driven mechanisms (not shown) to set the micrometer 4 to control needle lift, and to control the movement of the nozzle 1 and the measurement chamber 6, thereby to adjust the vertical angle 11 and the horizontal angle 10. The computer also controls the electronic valve (not shown) in the nozzle inlet 5 to automate the fuel supply to the nozzle 1. Further, the electrical signal from the pressure sensor 17 is fed back to the computer and the first and second fuel flow measurement systems are controlled by the computer. It will be appreciated, however, that the test rig may also be controlled manually, i.e. without the motors and/or the automation provided by the computer.

It will be appreciated that the test rig and the various associated measurement techniques described above in accordance with the invention, provide a comprehensive means of characterizing the fuel spray/jets produced by an injector nozzle. In summary, the following measurements are facilitated by the invention:

(i) measurement of individual fuel mass flows emerging from each of the nozzle spray holes, thereby to characterize the hole-to-hole distribution of mass flows from the various spray holes;

(ii) measurement of the momentum efficiency for each individual spray hole of the nozzle (the individual momentum efficiencies may be combined, for example by calculating an average value, to give a momentum efficiency for the nozzle as a whole);

(iii) measurement of the actual/effective spray/jet target direction for each spray hole, thereby enabling the designed spray hole axis to be checked;

(iv) measurement of the initial included jet angle of each fuel spray/jet in both vertical and horizontal planes;

(v) measurement of all of (ii) to (iv) above for a range of selected values of nozzle needle lift corresponding to values which occur during the dynamic operation of a nozzle and injector in an engine.

The parameters listed in (i) to (v) above are the most important parameters in determining, according to the invention, the combustion and emissions performance of a nozzle in an engine for a given nozzle design configuration, number of spray holes and overall nozzle fuel mass flow rate.

Many other variations are also possible within the ambit of the invention. Reference should therefore be made to the appended claims rather than the foregoing specific description as indicating the scope of the invention.

The invention claimed is:

1. An apparatus for testing a multi-hole fuel injector nozzle having a nozzle needle for controlling the fuel spray from a plurality of spray hole outlets of the multi-hole nozzle, the apparatus comprising:

a mounting means for the multi-hole nozzle;

a fuel supply means for supplying fuel to the multi-hole nozzle;

a measurement chamber for capturing the fuel spray from an individual spray hole outlet of the multi-hole nozzle when fuel is supplied to the multi-hole nozzle by the fuel supply means; and a measurement arrangement for determining the spray force of the fuel spray from said individual spray hole outlet;

wherein the multi-hole nozzle is mounted outside the measurement chamber and the apparatus is arranged such that the fuel spray from the individual spray hole outlet is directed into the measurement chamber, and wherein the relative orientation of the multi-hole nozzle and the measurement chamber is adjustable such that the fuel spray from any one of the plurality of nozzle spray hole outlets can be directed into the measurement chamber; and wherein the aperture is defined within a substantially conical wall of the measurement chamber, the conical wall being symmetrical about a measurement chamber axis which extends through the centre of the aperture and transverse to a longitudinal axis of the nozzle needle, and wherein the measurement chamber is arranged to pivot about a pivot axis which is substantially perpendicular to both the longitudinal axis of the nozzle needle and the measurement chamber axis, and intersects the longitudinal axis of the nozzle needle close to where the respective axes of the plurality of spray hole outlets intersect the longitudinal axis.

2. The apparatus as claimed in claim 1, further comprising a main chamber within which the measurement chamber is located, the mounting arrangement being arranged such that the multi-hole nozzle extends into the main chamber, the main chamber being arranged to collect the fuel from the other spray hole outlets which is not directed into the measurement chamber and including an outlet for fuel, wherein the outlet is in fluid communication with a measurement system for quantifying the fuel collected in the main chamber.

3. The apparatus as claimed in claim 1, further comprising a target mounted within the measurement chamber, the target being connected to a sensor which is located remotely from the target, and the apparatus being arranged such that the fuel spray from the individual spray hole outlet is directed at the target, and the sensor being calibrated to determine the spray force of the fuel spray impacting the target.

4. The apparatus as claimed in claim 3, wherein the sensor is located outside a main chamber within which the measurement chamber is located, and into which the multi-hole nozzle extends.

5. The apparatus as claimed in claim 3, wherein the sensor is connected to the target through a closed hydraulic circuit.

6. The apparatus as claimed in claim 1, wherein the vertical position of the multi-hole nozzle within the mounting arrangement is adjustable.

7. An apparatus for testing a multi-hole fuel injector nozzle having a nozzle needle for controlling the fuel spray from a plurality of spray hole outlets of the multi-hole nozzle, the apparatus comprising:

- a mounting means for the multi-hole nozzle;
- a fuel supply means for supplying fuel to the multi-hole nozzle;
- a measurement chamber for capturing the fuel spray from an individual spray hole outlet of the multi-hole nozzle when fuel is supplied to the multi-hole nozzle by the fuel supply means;
- a measurement arrangement for determining the spray force of the fuel spray from said individual spray hole outlet; and
- a target mounted within the measurement chamber, the target being connected to a sensor through a closed hydraulic circuit, the sensor being located remotely from the target, and the apparatus being arranged such that the fuel spray from the individual spray hole outlet is directed at the target, and the sensor being calibrated to determine the spray force of the fuel spray impacting the target, wherein the target is mounted to a plunger which is slidably received within a bore, the bore constricting the target to move in a substantially linear direction;

wherein the multi-hole nozzle is mounted outside the measurement chamber and the apparatus is arranged such that the fuel spray from the individual spray hole outlet is directed into the measurement chamber, and wherein the relative orientation of the multi-hole nozzle and the measurement chamber is adjustable such that the fuel spray from any one of the plurality of nozzle spray hole outlets can be directed into the measurement chamber.

8. The apparatus as claimed in claim 7, wherein the bore is connected to the sensor by a conduit containing hydraulic fluid.

9. An apparatus as claimed in claim 7, wherein the plunger is arranged to periodically rotate or oscillate within the bore thereby to minimise the static friction of the plunger within the bore.

10. An apparatus for testing the fuel spray from individual spray hole outlets of a multi-hole fuel injector nozzle, the apparatus comprising:

- a mounting arrangement for the multi-hole fuel injector nozzle;
- a fuel supply arrangement for supplying fuel to the multi-hole nozzle;
- a spray target plate at which the fuel spray from an individual spray hole outlet of the multi-hole nozzle is directed; and
- a sensor connected to the spray target plate and calibrated to determine the spray force of the fuel spray from the individual spray hole outlet impacting the spray target plate,
- wherein the sensor is located remotely from the spray target plate.

11. The apparatus as claimed in claim 10, further comprising a main chamber, wherein the spray target plate is located within the main chamber and the sensor is located outside the main chamber.

12. The apparatus as claimed in claim 10, wherein the sensor is connected to the spray target plate through a closed hydraulic circuit.

13. The apparatus as claimed in claim 12, wherein the spray target plate is mounted to a first plunger which is slidably received within a first bore, the first bore constraining the spray target plate to move in a substantially linear direction.

14. The apparatus as claimed in claim 13, wherein the first plunger is arranged to periodically rotate or oscillate within the first bore thereby to minimise the static friction of the first plunger within the first bore.

15. The apparatus as claimed in claim 13, wherein the first bore is connected to the sensor by a conduit containing hydraulic fluid.

16. The apparatus as claimed in claim 13, wherein the closed hydraulic circuit includes a substantially vertical second bore in fluid communication with the first bore and the sensor.

17. The apparatus as claimed in claim 16, wherein the apparatus further comprises a second plunger slidably received within the second bore, the second plunger comprising means for supporting a known mass, thereby to calibrate the sensor.

18. A method of testing a multi-hole fuel injector nozzle having a nozzle needle for controlling the fuel spray from a plurality of spray hole outlets of the multi-hole injector nozzle, the method comprising:

- supplying fuel to the multi-hole fuel injector nozzle for a predetermined test period;
- collecting the fuel spray emerging from an individual spray hole outlet of the multi-hole nozzle in a first chamber during the predetermined test period;
- determining the spray force exerted by the fuel spray from the individual spray hole outlet on a target located within the first chamber during the predetermined test period; and adjusting the relative orientation of multi-hole injector nozzle and the first chamber so as to direct the fuel spray from another one of the spray hole outlets into the first chamber.

19. The method of claim 18, including determining a mass flow of the fuel spray from the individual spray hole outlet by measuring the quantity of fuel collected in the first chamber during the predetermined test period.

20. The method as claimed in claim 19, wherein the mass flow and the spray force are determined simultaneously during the test period.

21. The method as claimed in claim 18, further comprising collecting the fuel spray emerging from the other spray hole outlets of the multi-hole nozzle in a second chamber during the predetermined test period, and determining the mass flow of fuel from the other spray hole outlets by measuring the quantity of fuel collected in the second chamber during the predetermined test period.

22. A method of testing a multi-hole fuel injector nozzle using a measurement chamber having an aperture defined therein, the method comprising:

supplying fuel to the multi-hole nozzle;

adjusting the relative orientation of the multi-hole nozzle and the measurement chamber; and monitoring the spray force of fuel entering the measurement chamber through the aperture, thereby to determine the effective direction and/or the initial included angle of the fuel spray emerging from an individual spray hole outlet of the multi-hole nozzle.

23. A method as claimed in claim 22, wherein fuel is continually supplied to the multi-hole nozzle and the spray force is continually monitored as the relative orientation of the multi-hole nozzle and the measurement chamber is adjusted.

24. A method as claimed in claim 23, wherein the measurement chamber is moved in a substantially vertical plane, thereby to determine the effective direction and/or the initial included angle of the fuel spray emerging from the individual spray hole outlet of the multi-hole nozzle in the vertical plane.

25. A method as claimed in claim 23, wherein the measurement chamber is moved in a substantially horizontal plane, thereby to determine the effective direction and/or the initial included angle of the fuel spray emerging from the individual spray hole outlet of the multi-hole nozzle in the horizontal plane.

26. A method as claimed in claim 22, wherein the measurement chamber is moved relative to the multi-hole nozzle.

27. A method as claimed in claim 22, the method further comprising: moving the measurement chamber relative to the multi-hole nozzle in one direction to a first position at which a decrease in spray force is monitored; and continuing to move the measurement chamber in the same direction to a second position at which the monitored spray force decreases substantially to zero, and determining the initial included angle of fuel emerging from the individual spray hole outlet from the difference between the first and second positions of the measurement chamber.

28. An apparatus for testing a multi-hole fuel injector nozzle having a nozzle needle for controlling the fuel spray from a plurality of spray hole outlets of the multi-hole nozzle, the apparatus comprising:

a mounting means for mounting the multi-hole nozzle to the apparatus;

a fuel supply means for supplying fuel to the multi-hole nozzle;

a measurement chamber for capturing the fuel spray from an individual spray hole outlet of the multi-hole nozzle when fuel is supplied to the multi-hole nozzle by the fuel supply means; and a measurement arrangement for determining the spray force of the fuel spray from said individual spray hole outlet;

wherein the multi-hole nozzle is mounted outside the measurement chamber and the apparatus is arranged such that the fuel spray from the individual spray hole outlet is directed into the measurement chamber, and wherein the relative orientation of the multi-hole nozzle and the measurement chamber is adjustable while the multi-hole nozzle is mounted to the apparatus such that the fuel spray from any one of the plurality of nozzle spray hole outlets can be directed into the measurement chamber.

29. The apparatus as claimed in claim 28, further comprising a main chamber within which the measurement chamber is located, the mounting arrangement being arranged such that the multi-hole nozzle extends into the main chamber, the main chamber being arranged to collect the fuel from the other spray hole outlets which is not directed into the measurement chamber and including an outlet for fuel, wherein the outlet is in fluid communication with a measurement system for quantifying the fuel collected in the main chamber.

30. The apparatus as claimed in claim 28, further comprising a target mounted within the measurement chamber, the target being connected to a sensor which is located remotely from the target, and the apparatus being arranged such that the fuel spray from the individual spray hole outlet is directed at the target, and the sensor being calibrated to determine the spray force of the fuel spray impacting the target.

31. The apparatus as claimed in claim 30, wherein the sensor is located outside a main chamber within which the measurement chamber is located, and into which the multi-hole nozzle extends.

32. The apparatus as claimed in claim 30, wherein the sensor is connected to the target through a closed hydraulic circuit.

33. The apparatus as claimed in claim 32, wherein the target is mounted to a plunger which is slidably received within a bore, the bore constricting the target to move in a substantially linear direction.

34. The apparatus as claimed in claim 33, wherein the bore is connected to the sensor by a conduit containing hydraulic fluid.

35. An apparatus as claimed in claim 33, wherein the plunger is arranged to periodically rotate or oscillate within the bore thereby to minimise the static friction of the plunger within the bore.

36. The apparatus as claimed in claim 28, wherein the arrangement of the apparatus provides for relative rotation between the multi-hole nozzle and the measurement chamber.

37. The apparatus as claimed in claim 28, wherein the vertical position of the multi-hole nozzle within the mounting arrangement is adjustable.

* * * * *